Patented Feb. 20, 1923.

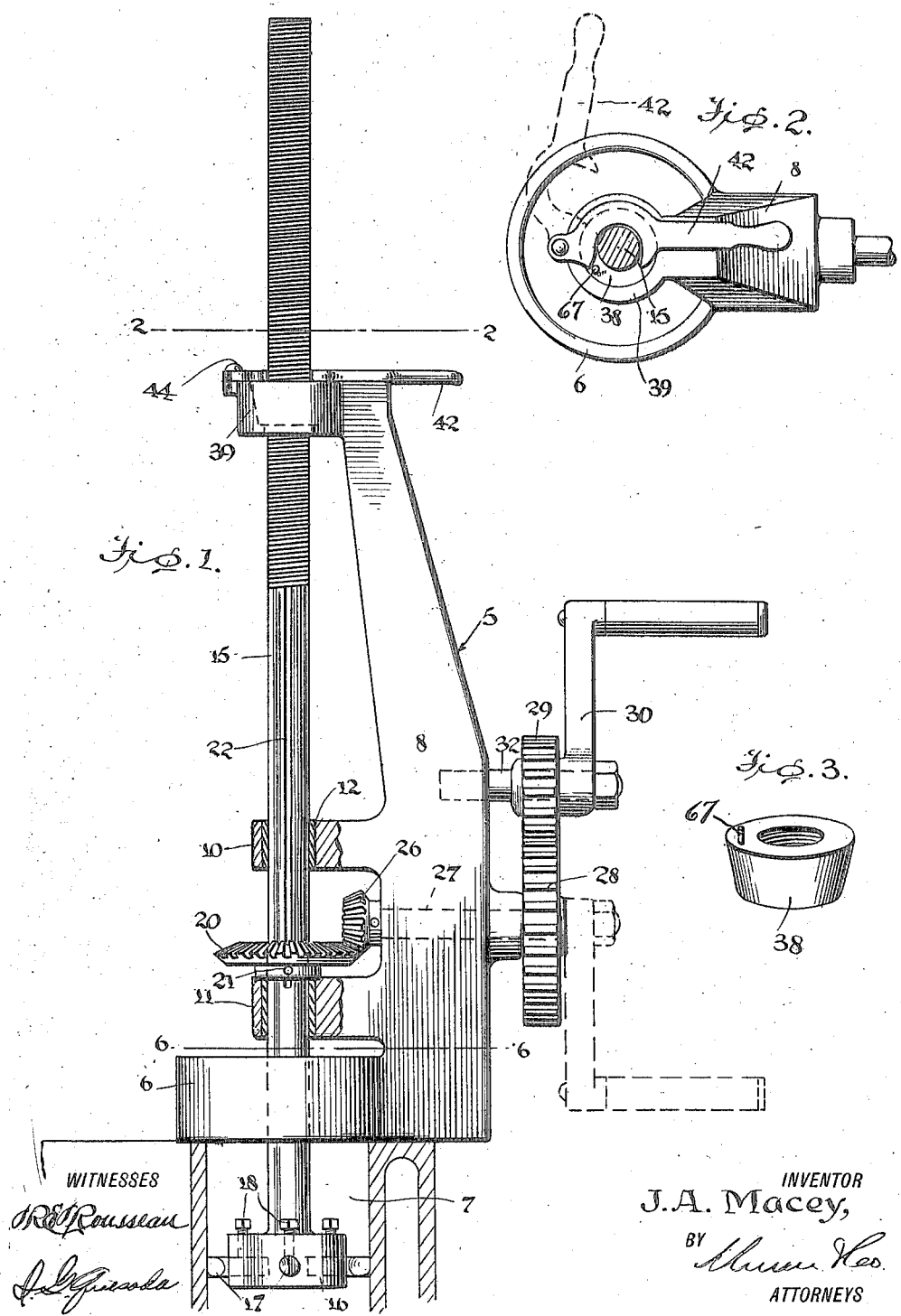

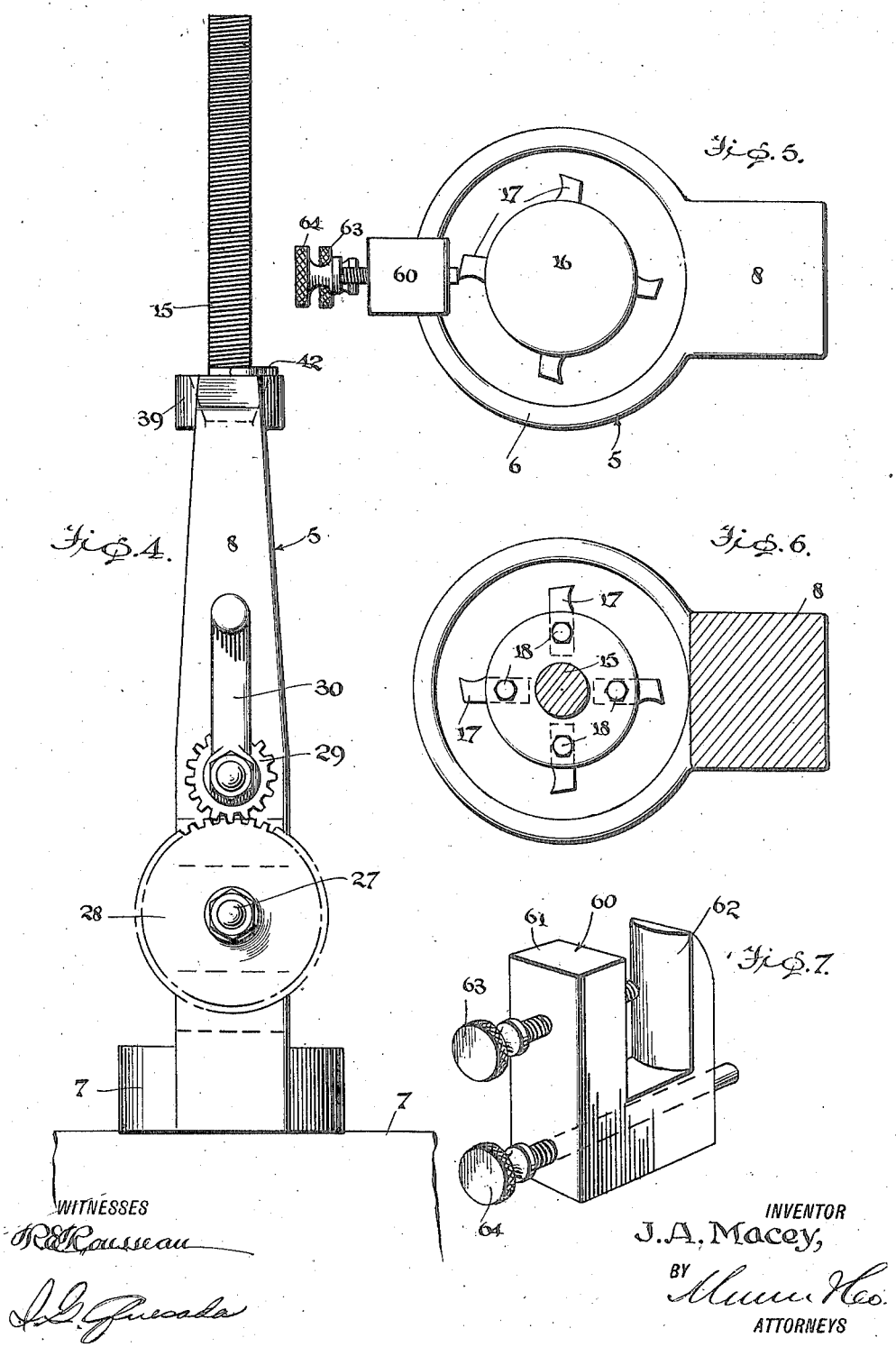

1,445,699

UNITED STATES PATENT OFFICE.

JOHN ALBERT MACEY, OF KANSAS CITY, KANSAS.

BORING MACHINE.

Application filed December 5, 1921. Serial No. 520,048.

*To all whom it may concern:*

Be it known that I, JOHN A. MACEY, a citizen of the United States, and resident of Kansas City, in the county of Wyandotte and State of Kansas, have invented certain new and useful Improvements in Boring Machines, of which the following is a specification.

This invention relates to boring machines especially adapted for use in reboring cylinders of engines.

An important object of this invention is to provide a portable boring machine for engine cylinders, having a plurality of radially arranged cutters adapted to uniformly engage the wall of the cylinder so as to rebore the same and which will not yield as a result of encountering hard spots in the wall of the cylinder and which will not make a deeper cut than desired when a soft place in the cylinder wall is encountered.

Another object of the invention is to provide a cylinder boring machine having simple means whereby the same may be readily and conveniently attached to a cylinder upon the removal of the cylinder head and which may be conveniently adjusted for operation.

Further the invention forming the subject matter of this application aims to provide a cylinder boring machine having novel means whereby the cutters are caused to feed as the cutters rotate.

A further object of the invention is to provide a boring machine for cylinders which is of highly simplified construction, durable in use and cheap to manufacture.

Other objects and advantages of the invention will be apparent during the course of the following description.

In the accompanying drawings forming a part of this application and in which like numerals are employed to designate like parts throughout the same, Figure 1 is a side elevation of the improved boring machine applied, parts being shown in section.

Figure 2 is a horizontal sectional view taken on line 2—2 of Figure 1.

Figure 3 is a perspective of a feed nut embodied in the invention.

Figure 4 is a side elevation of the improved boring machine, the view being taken at right angles to Figure 1.

Figure 5 is a bottom plan view of the improved boring machine, the clamp for the same being shown applied.

Figure 6 is a horizontal sectional view taken on line 6—6 of Figure 1.

Figure 7 is a perspective of a clamp embodied in the invention.

In the drawing the numeral 5 generally designates a frame which consists of a disk shaped base 6 adapted to be arranged flatly upon the upper end of a cylinder 7 after the head of the cylinder has been removed. The disk-shaped base 6 carries a standard or post 8 tapered toward its upper end and provided with spaced upper and lower bearings 10 and 11 respectively, the said bearings being provided with babbets 12 which reduce the friction between the parts to a minimum.

As illustrated in Figure 1 a feed shaft 15 is rotatably extended through the upper and lower bearings 10 and 11 and has its lower end formed with a disk-shaped head 16 provided with radial sockets which receive cutter blades 17 adjustably held in position by means of set screws 18.

When preparing the machine for operation the cutters 17 of which there may be four or more are adjusted by means of a pair of calipers and by reason of the fact that the blades are oppositely arranged the same may be accurately adjusted with a minimum of effort on the part of the operator.

The feed shaft 15 is rotated by means of a bevel gear 20 mounted on the shaft and having a radially arranged key 21 slidable in a longitudinal key-way 22 in the bar 15 so that when the bevel gear 20 is rotated the feed bar 15 will also be rotated. The bevel gear 20 is engaged by a pinion 26 having a shaft 27 to which a spur gear 28 may be operatively connected. A smaller spur gear 29 may be engaged with the spur gear 28 and operated by a hand crank 30. The spur gear 29 is rotatably mounted upon a stub-shaft 32 secured in the side of the standard 8 at a point above and in spaced relation to the shaft 27. This arrangement of gearing, is however, employed only when a deep cut is to be made and when a cut of the average depth is made the crank 30 may be connected directly to the shaft 27.

The feed bar is advanced by means of a feed nut 38 seated in a cone-shaped recess formed in the laterally projecting bearing 39 formed at the upper end of the standard 8. The feed nut 38 is interiorly screw threaded and receives the threaded portion of the bar 15. As illustrated in Figure 3 the feed nut 38 is tapered so that it will fit accurately within the tapered recess in the bearing member 39 whereby the feed bar will at all times be in alignment with the axis of the cylinder 7. The feed nut 38 is detachably held in position by means of a latch member 42 pivoted at its forward end to the bearing 39 as indicated at 44. The intermediate portion of the latch member 42 is provided with a socket which receives the feed bar 15 and the adjacent portion of the latch contacts with the top of the feed nut and holds the same against upward movement. When the feed bar reaches the limit of its forward movement the latch is swung to its inoperative position and the feed nut and shaft elevated and the nut returned to its original position. When the feed nut 38 has been returned to its original position, the cutting operation may be resumed.

By employing a plurality of radially arranged cutters as illustrated in Figure 1 the feed bar 15 and consequently the cutters will not yield when a hard place in the cylinder wall is encountered. Furthermore, the cutters will not make a deeper cut than desired when a soft place is encountered in the wall of the cylinder. Herein lies the advantage of employing cutters as illustrated over grinders usually employed for this purpose.

The clamping member illustrated in Figure 7 is indicated at 60 and is provided with spaced arms 61 and 62 for engagement with the base 6 and a convenient place on the cylinder. Thumb screws 63 and 64 are threaded through the clamp and form a means for holding the clamp and the base firmly in position.

As illustrated in Fig. 2, the combined centering and feed nut 38 is securely held within the tapered opening in the bearing 39 by means of the latch 47 and the nut is provided with an upstanding pin 67 which engages the latch and thereby limits the rotation of the nut.

Having thus described my invention what is claimed is:—

1. A boring machine for cylinders comprising a base having means whereby the same may be detachably connected to a cylinder, said base being provided with an upstanding standard having laterally projecting aligned bearings, a feed bar rotatably extended through said bearings and having a head, cutting devices carried by said head, the rear portion of said feed bar being threaded, the upper portion of said standard being provided with a laterally projecting bearing having a tapered recess, a combined centering and feed nut of tapered formation received in said recess and receiving the threaded portion of said feed bar, said tapered feed nut being detachably arranged in said recess, and a latch pivoted to said second named bearing and adapted to engage said feed nut to hold the same in position.

2. A cylinder boring machine comprising a base adapted to be firmly secured to a cylinder and having a standard provided with a pair of spaced bearings adjacent its lower portion, a feed bar rotatably extended through said bearings and having its forward portion provided with cutting devices, the upper portion of said standard being provided with a laterally projecting bearing having a tapered opening, a combined feed and centering nut received in said tapered opening, the rear portion of said feed bar being threaded for engagement with said tapered nut, means to hold said nut in said tapered recess, a gear connected to said shaft between said pair of bearings, a second gear connected to said first named gear and having a shaft rotatably extended through said standard, and means connected to said shaft whereby the same may be rotated.

JOHN ALBERT MACEY.